(12) United States Patent
Zufferey et al.

(10) Patent No.: US 7,476,020 B2
(45) Date of Patent: Jan. 13, 2009

(54) METHOD FOR SIMULATING A PROCESS PLANT AT LABORATORY SCALE

(75) Inventors: Benoit Zufferey, Sierre (CH); Francis Stoessel, Illzach (FR); Urs Groth, Zürich (CH)

(73) Assignee: Mettler - Toledo AG, Greifensee (CH)

( * ) Notice: Subject to any disclaimer, the term of this patent is extended or adjusted under 35 U.S.C. 154(b) by 238 days.

(21) Appl. No.: 11/530,928

(22) Filed: Sep. 12, 2006

(65) Prior Publication Data
US 2007/0067149 A1  Mar. 22, 2007

(30) Foreign Application Priority Data
Sep. 16, 2005 (EP) ................... 05108568

(51) Int. Cl.
  *G01K 17/00* (2006.01)
  *G06G 7/58* (2006.01)
(52) U.S. Cl. .................... 374/134; 703/12
(58) Field of Classification Search ........ 374/134, 374/137, 31–34, 36, 38, 102–103, 1; 73/865.6; 703/12, 2; 422/189
See application file for complete search history.

(56) References Cited

U.S. PATENT DOCUMENTS

| | | | | |
|---|---|---|---|---|
| 4,130,016 A * | 12/1978 | Walker | | 374/34 |
| 4,209,490 A * | 6/1980 | Duncan et al. | | 422/109 |
| 4,610,845 A * | 9/1986 | Tanberg | | 422/51 |
| 4,670,404 A * | 6/1987 | Swift et al. | | 436/147 |
| 5,590,051 A * | 12/1996 | Yokozawa | | 700/266 |
| 5,795,732 A * | 8/1998 | Schilling et al. | | 435/41 |
| 5,879,082 A * | 3/1999 | Smitherman et al. | | 374/110 |
| 6,088,630 A | 7/2000 | Cawlfield | | |
| 6,106,785 A * | 8/2000 | Havlena et al. | | 422/109 |
| 6,185,472 B1 * | 2/2001 | Onga et al. | | 700/121 |
| 6,610,968 B1 * | 8/2003 | Shajii et al. | | 219/497 |
| 7,045,288 B2 * | 5/2006 | Fermier et al. | | 435/6 |
| 7,070,324 B2 * | 7/2006 | Budmiger | | 374/57 |
| 7,149,590 B2 * | 12/2006 | Martin et al. | | 700/44 |
| 2002/0071798 A1 * | 6/2002 | DeCourcy et al. | | 422/211 |

(Continued)

FOREIGN PATENT DOCUMENTS

JP    2002119842 A *  4/2002

OTHER PUBLICATIONS

Bollyn, et al, Accelerated Scale-Up, Mettler-Toledo Publication 51724866 (1995), pp. 1-12.

(Continued)

*Primary Examiner*—Patrick J Assouad
*Assistant Examiner*—Bret Adams
(74) *Attorney, Agent, or Firm*—Standley Law Group LLP (57) ABSTRACT

A method, a laboratory device and the use of both are provided for simulating the dynamic temperature behavior of at least one part of a process plant, particularly an industrial reactor. The method provides a temperature profile and/or temperature setpoints at given time intervals for controlling the laboratory device. The temperature profile and/or temperature setpoints are derived from a mathematical model that describes the dynamic temperature behavior of at least one part of the process plant. The temperature profile and/or the temperature setpoints are used by a program for controlling the laboratory device.

19 Claims, 2 Drawing Sheets

U.S. PATENT DOCUMENTS

2004/0122641 A1* 6/2004 Miller et al. .................. 703/12
2005/0071142 A1* 3/2005 Chen et al. ..................... 703/11
2007/0038419 A1* 2/2007 Usuda et al. .................... 703/2

OTHER PUBLICATIONS

Uhl and Gray, Mixing: Theory and Practice, vol. 1, 1966, Academic Press, New York, pp. 128-137.

Chilton, et al, Heat Transfer Coefficients in Agitated Vessels, Industrial & Engineering Chemistry, vol. 36, No. 6, (1944), pp. 510-516.

Luyben, Processing Modeling, Simulation and Control for Chemical Engineers, 1990, McGraw Hill, pp. 177-182.

* cited by examiner

METHOD FOR SIMULATING A PROCESS PLANT AT LABORATORY SCALE

CROSS-REFERENCE TO RELATED APPLICATIONS

This application claims a right of priority under 35 USC §119 from European patent application 05 108 568.6, filed 16 Sep. 2005, the content of which is incorporated by reference as if fully recited herein.

TECHNICAL FIELD

The invention concerns a method for simulating the dynamic temperature behavior of at least one part of a process plant at laboratory scale.

BACKGROUND OF THE ART

Process plants for carrying out chemical and/or physical reactions are used in several industrial fields, for example the chemical, pharmaceutical or biological industry. Process plants are either purpose built for a specific reaction or designed as multi-purpose plants. Multi-purpose plants are especially suited for customer specific productions or for industrial fields with fast changing production lines and products. Therefore, multi-purpose plants are often operated discontinuously and either the multi-purpose plant and/or the reaction have to be adapted.

Any chemical and/or physical reaction is usually first developed at laboratory scale and then gradually expanded from laboratory scale to bench scale, to a pilot plant and then to a full-sized process plant. Such a scale-up process can be a quite expensive and also a very time consuming process, especially as certain aspects have to be determined again at each step of the scale up process. These aspects are for example the productivity and selectivity of the reaction, the quality of the product as well as aspects related to the safety and to environmental protection. Nowadays especially safety aspects and aspects concerning the environmental protection get more and more important.

Besides the classic approach of the gradually scale up of a chemical and/or a physical reaction theoretical approaches have been developed. M. Bollyn and others built, for example, a mathematical model based on kinetic reaction parameters, which allows a numerical simulation of the behavior of an industrial reactor or of a process plant. The kinetic reaction parameters have to be determined at laboratory scale with a reaction calorimeter and the quality of the numerical simulation stands and falls with the quality of the determination of the reaction kinetics. The determination of the reaction kinetics is only simple as long as the reaction itself is simple. For reactions with several reaction steps and/or byproducts such a determination can get very complicated and therefore time consuming.

For industries using multi-purpose plants it would be very interesting and helpful to have a simple and fast but nevertheless correct way of predicting the up-scaled behavior of a given reaction at laboratory scale.

It is therefore the aim of this invention to develop a method for simulating the dynamic temperature behavior of at least one part of a process plant at laboratory scale.

SUMMARY OF THE INVENTION

A process plant comprises at least one industrial reactor with an industrial reaction vessel, in which a chemical and/or a physical reaction can be carried out and which interacts with an industrial temperature-controlling device, and an industrial heat-transfer unit interacting with the industrial temperature-controlling device. The temperature of the reaction vessel and particularly of its contents can be controlled directly and/or indirectly depending on the type of temperature-controlling device used. The process plant and in particular the industrial temperature-controlling device are controlled by a control unit.

A laboratory device utilizable for the realization of the simulation method is built comparably but on a much smaller scale. The laboratory device comprises a laboratory reaction vessel for carrying out a chemical and/or a physical reaction, a laboratory temperature-controlling device interacting with the laboratory reaction vessel, a laboratory heat-transfer unit interacting with the laboratory temperature-controlling device, and a controller for operating and controlling the laboratory device. The controller preferably comprises a program with a temperature control algorithm. The controller mainly controls the laboratory device by preset temperature profiles and/or by setting temperature setpoints.

The terms "industrial" and "laboratory" relate mainly to the size, scale and/or the field of application of the item described.

Laboratory devices, such as for example reaction calorimeters, automated laboratory reactors as well as temperature-controlled laboratory reactors, can be used to carry out chemical and/or physical reactions and processes at a small scale. Common laboratory devices have reaction vessel volumes starting with a few milliliters, or even less, up to a few liters. Normally they are used for developing chemical and/or physical reactions as well as for determining the kinetics of a reaction and/or the thermodynamic properties and parameters of a reaction.

Most laboratory devices are quite versatile, so that reactions can be carried out safely even under extreme temperature and/or pressure conditions. Laboratory temperature-controlling devices and laboratory heat-transfer units are characterized in that they are quite powerful and can control the temperature of the reaction mixture fast and accurately. Such a laboratory device can follow and/or reach temperature profiles and/or temperature setpoints very fast. The dynamic temperature of a common laboratory device is nearly ideal.

The reaction temperature is an important parameter for any chemical and/or physical reaction. A slight change of the reaction temperature leads for example to different products and/or to different reaction yields. A laboratory device is mainly controlled and operated by at least one temperature related to at least one part of the laboratory device. The controller provides a preset temperature profile and/or temperature setpoints at given time intervals. As used herein, a "temperature profile" represents a plot of temperature against time. It can be a continuous profile and/or can comprise discrete temperature setpoints. The temperature controlling the laboratory device is directly and/or indirectly related to the reaction temperature, such as for example the temperature of a reaction mixture provided in the laboratory reaction vessel or a temperature of the temperature-controlling device.

When a temperature profile and/or setpoint is provided by the controller, the laboratory temperature-controlling device interacting with the laboratory heat-transfer unit starts to change its temperature accordingly and when the given temperature is reached, that temperature is maintained for a preset time period. As the laboratory temperature-controlling device also interacts with the laboratory reaction vessel, the temperature of the reaction vessel will change accordingly, as well as that of any contents of the reaction vessel.

As a safety measure the provided temperature is generally monitored at certain time intervals using a suitable temperature probe.

A process plant is much bigger than a laboratory device with reaction vessel volumes of a few liters up to several cubic meters. Due to their size and to the materials used it is nearly impossible to build a process plant with an ideal dynamic temperature behavior.

When a laboratory device is used to simulate the dynamic temperature behavior of at least one part of a process plant, the dynamic temperature behavior of the process plant is forced onto the laboratory device, so that the laboratory device no longer behaves ideally. Therefore, it is essential to know the dynamic temperature behavior of at least one part of the process plant. The temperature dynamics of a process plant are at least partially governed by the heat and by the energy exchanged between the process plant and the reaction.

For simulating the dynamic temperature behavior of at least one part of the process plant the laboratory device can be controlled by a temperature profile and/or by temperature setpoints being provided at given time intervals. The temperature profile and/or the temperature setpoints are derived from a mathematical model, which describes the dynamic temperature behavior of the at least one part of the process plant. Thereby, the laboratory device, in particular its dynamic temperature, is forced to follow the dynamic temperature of the process plant. The mathematical model is used to determine temperature setpoints as a function of the time, which are arranged in a temperature profile and/or as discrete temperature setpoints. The profile and/or the setpoints can be utilized by the controller for controlling the laboratory device.

In that way the laboratory device can mimic and follow the dynamic temperature behavior of the process plant. If a chemical and/or a physical reaction is carried out in a laboratory device simulating the dynamic temperature behavior of a process plant, the rate of reaction, the yield, the selectivity as well as other properties of the reaction will closely resemble the properties which would be obtained when the reaction is carried out at industrial scale in a process plant.

Such a simulation is very advantageous as the time for a scale up process will be extremely shortened as well as being cost efficient. Aspects concerning for example the safety, quality, quantity, selectivity and/or the environmental protection can be determined at laboratory scale, where the reaction masses are still small and easy to handle.

This is particularly interesting for highly exothermic or for temperature sensitive reactions, as any scale up for these reactions is otherwise very time consuming, expensive and can even be dangerous, especially when the effect of the heat of reaction at industrial scale is misjudged.

Commonly known laboratory devices are operated by controlling and by adapting the temperature of the contents of their reaction vessel according to the desired reaction temperature and any preset safety margins. Therefore, a temperature profile is and/or temperature setpoints are used to control at least one temperature related to at least one part of the laboratory device, preferably one directly and/or indirectly related to the reaction temperature. This temperature can be a temperature related to the laboratory reaction vessel, for example the actual temperature inside the reaction vessel and/or that of its contents, or a temperature related to the laboratory temperature-controlling device. The laboratory temperature-controlling device can be designed for a direct and/or for an indirect temperature control.

The main item for simulating the dynamic temperature behavior of a process plant at laboratory scale is the proper set up of the mathematical model describing the dynamic temperature behavior of at least one part of the process plant. As a process plant can be assembled in many different ways using varying materials, items and means a mathematical model has to be determined individually for each process plant or at least for at least one part of the process plant to be simulated. In particular the dynamic temperature behavior of the industrial reactor will be simulated.

The temperature profile and/or the temperature setpoints derived from the mathematical model are utilized by the temperature control algorithm and/or by the control program of the laboratory device. The mathematical model can be derived from at least one property or from at least one chemical and/or physical parameter derived from the property, the property being characteristic for at least one part of the process plant and relating to its dynamic temperature. Such property can for example be the configuration, the geometry and/or the material of at least one part of the process plant, in particular of the industrial reactor.

Preferably the mathematical model is at least partially derived from the heat balance of that part of the process plant, whose dynamic temperature behavior is to be simulated. The heat balance is an expression for the total heat flow or for the total energy flow to and from the part of the process plant.

In its most general form the heat balance of a reactor describes the total heat flow as a function of the time taking into account any inflowing and any outflowing heat or energy component. The dynamic temperature behavior of an industrial reactor can be at least partially characterized by its heat balance.

The equation describing the heat balance of a reactor comprises terms for any kind of inflowing and/or outflowing heat or energy. Some of these terms can be calculated or have to be estimated using known properties and parameters, others, such as the outside heat-transfer coefficient, can only be estimated using experimental data.

These experimental data are preferably obtained by heating/cooling experiments carried out in the process plant. It is especially favorable, when at least two experiments with a reaction mixture comprising at least one reactant or compound and with at least two different fill levels of the reaction vessel are carried out for each process plant. However, a single experiment is sufficient for a great number of simulations.

The heat balance of the industrial reactor contains a term which is related to the temperature of the industrial temperature-controlling device, in particular to its dynamic temperature evolution. The dynamic temperature evolution of the industrial temperature-controlling device is governed by several parameters and properties. The dynamic temperature evolution depends largely on the configuration and on the dynamics of the industrial heat-transfer unit, in particular how the temperature is controlled and how temperature setpoints are set. In general, when a temperature profile and/or a temperature setpoint are given, the heat-transfer unit starts to react accordingly by rising or by lowering the temperature related to the temperature-controlling device.

The term or expression related to the dynamic temperature evolution of the industrial temperature-controlling device is preferably determined experimentally and individually for each part of a process plant to be simulated. It is possible to derive the expression from the same heating/cooling experiments used to estimate terms related to the heat balance of a reactor, such as the outside heat-transfer coefficient.

When the process plant to be simulated is sufficiently characterized and the mathematical model describing the dynamic temperature behavior of the at least one part of the process plant is set up, the model is used to determine a temperature profile and/or temperature setpoints, which are used in combination with the temperature control algorithm and which enable the simulation of the dynamic temperature behavior of the corresponding process plant with the laboratory device.

The simulation of the dynamic temperature behavior of at least one part of a process plant using a laboratory device comprises several steps. A mathematical model describing the dynamic temperature behavior of at least the part of a process plant has to be determined and the thermodynamic properties of the reaction under investigation have to be determined.

The thermodynamic properties of a chemical and/or a physical reaction can be determined by carrying it out in a classic laboratory device at at least two different reaction temperatures. However, a single experiment at one reaction temperature can be sufficient. The term classic describes a laboratory device which is not simulating any part of a process plant.

For carrying out the reaction in a classic laboratory device the temperature profile and/or setpoints are chosen according to the given reaction and the safety margins of the laboratory device. During the course of reaction at least one temperature is measured at given time intervals, the monitored temperature or the monitored temperature profile being related to at least one part of the laboratory device and/or to the chemical and/or the physical reaction. The temperature can for example be a temperature related to the reaction vessel, the reaction mixture inside the reaction vessel, the temperature-controlling device and/or a temperature related to the heat-transfer unit.

The monitored temperatures and/or the monitored temperature profile can then be used to monitor the laboratory device as well as to determine at least one thermodynamic property or parameter related to the reaction carried out in the classic laboratory device. A thermodynamic property to be determined can be for example the heat capacity, the heat of reaction or the heat accompanying any physical process. This is accomplished in order to gain information about the reaction itself. Additionally it is possible to determine the kinetic properties of the reaction. The evaluation of a reaction carried out in a laboratory device can preferably be carried out by the same program used to control the laboratory device or can be carried out by transferring all monitored and preset data to an external computer comprising a suitable evaluation program.

After the dynamic temperature behavior of the process plant as well as the thermodynamic behavior of the reaction under investigation has been determined, the reaction is carried out again in the laboratory device simulating the dynamic temperature behavior of the process plant. This time the laboratory device uses a temperature profile and/or temperature setpoints which are derived from the mathematical model. Therefore, the dynamic temperature behavior of the laboratory device mimics or follows that of the part of the process plant to be simulated.

During the course of reaction again at least one temperature related to at least one part of the laboratory device and/or to the reaction is measured and monitored at given time intervals. The monitored temperature profile and/or the monitored temperature values are used to determine at least one thermodynamic property related to at least one part of the reaction. The derived thermodynamic property relates to the reaction at industrial-scale, as the laboratory device simulates the dynamic temperature behavior of at least one part of the process plant.

The steps of monitoring at least one temperature profile and of determining at least one thermodynamic property are repeated until the end of the reaction is reached. The end of the chemical and/or the physical reaction is indicated by reaching a stop value for any predefined property or parameter related to the reaction. Preferably the predefined property or parameter is derived from a preset maximum or minimum temperature, the consumption rate of at least one of the reactants, the production rate, the yield of the reaction or a preset time period or a combination thereof. The listed properties and parameters are just examples, other parameters or properties related to the reaction can also be used.

The laboratory device can simulate only the dynamic temperature behavior of one part of the process plant at the same time, but it is possible to set up several mathematical models in advance and feed the determined temperature profiles and/or temperature setpoints into a program controlling the laboratory device. It is also possible to store more than one model, more than one temperature profile and/or more than one set of temperature setpoints related to different parts of a process plant and/or to different process plants for example in a suitable memory device interacting with the program.

The temperature profile and/or the temperature setpoints are tracked and monitored at given time intervals to control at least one actual temperature related to the laboratory device. The temperature profile and/or the setpoints can be adapted and changed according to the actual measured temperature.

In a preferred embodiment the thermodynamic properties are scaled applying a scaling factor corresponding to differences between the process plant and the laboratory device, the difference being preferably related to the volumes and/or to the reaction masses. By scaling the properties, a reaction carried out in the process plant can be adapted to the laboratory device and vice versa.

The temperature profile and/or the setpoints are calculated or derived from the mathematical model and utilized by the program comprising the temperature control algorithm. The obtained profile and/or setpoints are adaptable during the course of a reaction, which can be necessary to avoid too high temperatures and/or pressures in the laboratory device, but can also be used to manipulate the reaction, for example to optimize it.

A laboratory device, in particular a reaction calorimeter, an automated laboratory reactor and/or a temperature-controlled laboratory reactor, for performing such a simulation method comprises a laboratory reaction vessel, which interacts with a laboratory temperature-controlling device, a laboratory heat-transfer unit interacting with the laboratory temperature-controlling device, at least one temperature probe and a controller, which controls the laboratory device and comprises a program with a temperature control algorithm.

Preferably a stirrer is arranged inside the reaction vessel for stirring a reaction mixture. The stirrer can be any kind of stirrer utilizable for a process plant and/or for a laboratory device, such as for example a propeller, an anchor, an impeller or a turbine.

Preferably the laboratory device can at least control the stirrer speed as well as directly and/or indirectly the temperature of a reaction mixture arranged in the reaction vessel very accurately and very fast.

The laboratory as well as the industrial temperature-controlling device can be designed for direct and/or for indirect temperature control. An indirect temperature-controlling device can for example be a jacket resembling a double-walled device surrounding the reaction vessel as well as coils arranged around and/or inside the reaction vessel or a compensation heater. The jacket or the coils are usually filled with a heat-transfer medium, whose temperature can be controlled with the heat-transfer unit, which comprises at least one thermostat and/or at least one cryostat for heating and/or cooling the heat-transfer medium. Instead of a thermostat and/or a cryostat the heat-transfer unit can also comprise for example brick water, tap water, heated steam and/or liquid gases for the temperature control.

A direct temperature-controlling device can for example be a kind of coil, in particular a heating coil, which is in direct contact with the reactants. Such a coil can either be massive or hollow. The temperature of a heating coil can be controlled electrically and that of a hollow one preferably containing a heat-transfer medium again through interaction with the heat-transfer unit. When the heat-transfer unit comprises at least one thermostat and at least one cryostat or cooling and/or heating means, the temperature-controlling device can also comprise a combination of both, for example a jacket for indirect cooling and a heating coil for direct heating. The heat-transfer medium can be any medium known to be utilized in a thermostat, a cryostat and/or a medium utilized for that purpose in any laboratory and/or in any industrial temperature controlling device.

The at least one measuring and/or temperature probe is preferably arranged in the reaction vessel and/or in the temperature-controlling device. The temperature values monitored at given time intervals are sent to the controller and are for example utilized for checking if a preset temperature has been reached and/or is maintained as well as for deriving certain thermodynamic properties thereof. The temperature probe is preferably designed to monitor the actual temperature of the reaction mixture directly and/or indirectly.

In a preferred embodiment the program is designed to use a temperature profile and/or setpoints derived from the mathematical model. The controller comprising the program can for example be integrated in the laboratory device and/or be an external computer or a combination of both.

In a preferred embodiment the program is designed to control any setpoint temperature or temperature profile as well as all other controllable parameters of the laboratory device and can also be used for recording and evaluating any data obtained during the course of a chemical and/or a physical reaction, which are mainly temperature data.

In a preferred embodiment the laboratory device used to perform the simulation can comprise a controller designed to control, record and to evaluate at least any preset and/or monitored temperature profile and/or temperature setpoints and in particular the laboratory device can be a reaction calorimeter.

The described method can be used to simulate the dynamic temperature behavior of at least one part of a process plant utilizing a laboratory device with the described features. Preferably the dynamic temperature behavior of an industrial reactor comprised in the process plant is simulated.

Therefore, it is possible to use a single laboratory device for simulating the dynamic temperature behavior of several parts of several process plants, one at a time.

BRIEF DESCRIPTION OF THE DRAWINGS

A method for simulating the dynamic temperature behavior of at least one part of a process plant at laboratory scale and the determination of a mathematical model are described in detail below by means of specific examples and by the following figures. The figures show.

DETAILED DESCRIPTION OF A PREFERRED EMBODIMENT

The method for simulating the dynamic temperature behavior of at least one part of a process plant using a suitable laboratory device is described in the following. Preferably a reaction calorimeter, such as the RC1 from Mettler-Toledo is used as laboratory device and the term reaction calorimeter will be used in the following instead of laboratory device. Nevertheless, the simulation can be performed accordingly, using any kind of suitable laboratory device.

Because the following detailed description utilizes a number of mathematical symbols, a table is provided to provide the definition and dimensionality of the symbols used.

Symbols
A heat exchange area (including vortex formation) [m$^2$]
A variable [W m$^{-2}$ K$^{-2}$]
B variable [W m$^{-2}$ K$^{-1}$]
C variable [−] or [°C]
C stirrer constant [−]
$Cp_i$ specific heat capacity of the ith component in the reaction mixture [J kg$^{-1}$ K$^{-1}$]
$Cp_j$ specific heat capacity of the heat-transfer fluid [J kg$^{-1}$ K$^{-1}$]
$Cp_r$ specific heat capacity of the reaction mixture [J kg$^{-1}$ K$^{-1}$]
$\overline{C}_w$ mean heat capacity of the reactor [J K$^{-1}$]
$d_a$ diameter of the stirrer [m]
$d_r$ diameter of the reaction vessel [m]
$d_w$ thickness of the reaction vessel wall [m]
G gravitational constant [m s$^{-2}$]
G control gain [−]
$h_j$ outside heat-transfer coefficient [W m$^{-2}$ K$^{-1}$]
$h_{j,air}$ outside heat-transfer coefficient due to air [W m$^{-2}$ K$^{-1}$]
$h_r$ internal heat-transfer coefficient [W m$^{-2}$ K$^{-1}$]
K proportional term [−]
I integral term [s]
$m_i$ mass of the ith component in the reaction mixture [kg]
$m_j$ total mass of the heat-transfer medium [kg]
$\dot{m}_j$ mass flow rate of the heat-transfer medium [kg s$^{-1}$]
$m_r$ mass of the reaction mixture [kg]
$m_{w,i}$ mass of the ith component in the reaction vessel wall [kg]
N stirrer revolution speed [s$^{-1}$]
Ne power number [−]
$q_{dos}$ power input due to dosing [W]
$q_{ex}$ power exchange with the heat-transfer fluid [W]
$q_{hx}$ power provided by the heat-transfer unit [W]
$q_{loss}$ power losses to the surrounding [W]
$q_{mix}$ power due to the mixing enthalpy [W]
$q_{rx}$ power of reaction [W]
$q_{reflux}$ power dissipated in the reflux condenser [W]
$q_{st}$ power due to stirring [W]
$q_{vap}$ power due to evaporation [W]
T time [s]
T temperature [K]
$T_{amb}$ ambient air temperature [K]
$T_j$ jacket temperature [K]
$T_{j,0}$ initial mean jacket temperature [K]
$T_{j,in}$ inlet temperature of the jacket fluid [K]
$T_{j,max}$ maximal jacket temperature of modeling [K]
$T_{j,min}$ minimal jacket temperature of modeling [K]
$T_{j,out}$ outlet temperature of the jacket fluid [K]
$T_{j,set}$ jacket setpoint temperature [K]
$T_r$ temperature of the reaction mixture [K]
$T_{r,0}$ initial temperature of the reaction mixture [K]
$T_{r,set}$ setpoint temperature of the reaction mixture [K]
$T_w$ temperature of the reaction vessel wall [K]

U overall heat-transfer coefficient [W m$^{-2}$ K$^{-1}$]
X thermal conversion [–]

Greek Symbols
$\Delta T_m$ mean temperature difference between reaction mixture and the heat-transfer medium [K]
$\Delta t$ time interval [K]
$\lambda_r$ thermal conductivity of the reaction mixture [W m$^{-1}$ K$^{-1}$]
$\lambda_w$ thermal conductivity of the reaction vessel wall [W m$^{-1}$ K$^{-1}$]
$\mu_r$ viscosity of the reaction mixture [kg m$^{-1}$ s$^{-1}$]
$\rho_r$ density of the reaction mixture [kg m$^{-3}$]
$\tau$ time constant [s]
$\tau_C$ cooling time constant [s]
$\tau_h$ heating time constant [s]
$\Phi(T_r)$ temperature dependent resistance due to the reactor [m$^2$ K W$^{-1}$]

Before any part of a process plant can be simulated using a laboratory device, preferably a reaction calorimeter, the dynamics of the process plant, especially its dynamic temperature behavior has to be determined. In the following several industrial reactors are characterized and their individual dynamic temperature behavior are determined.

Figure 1:
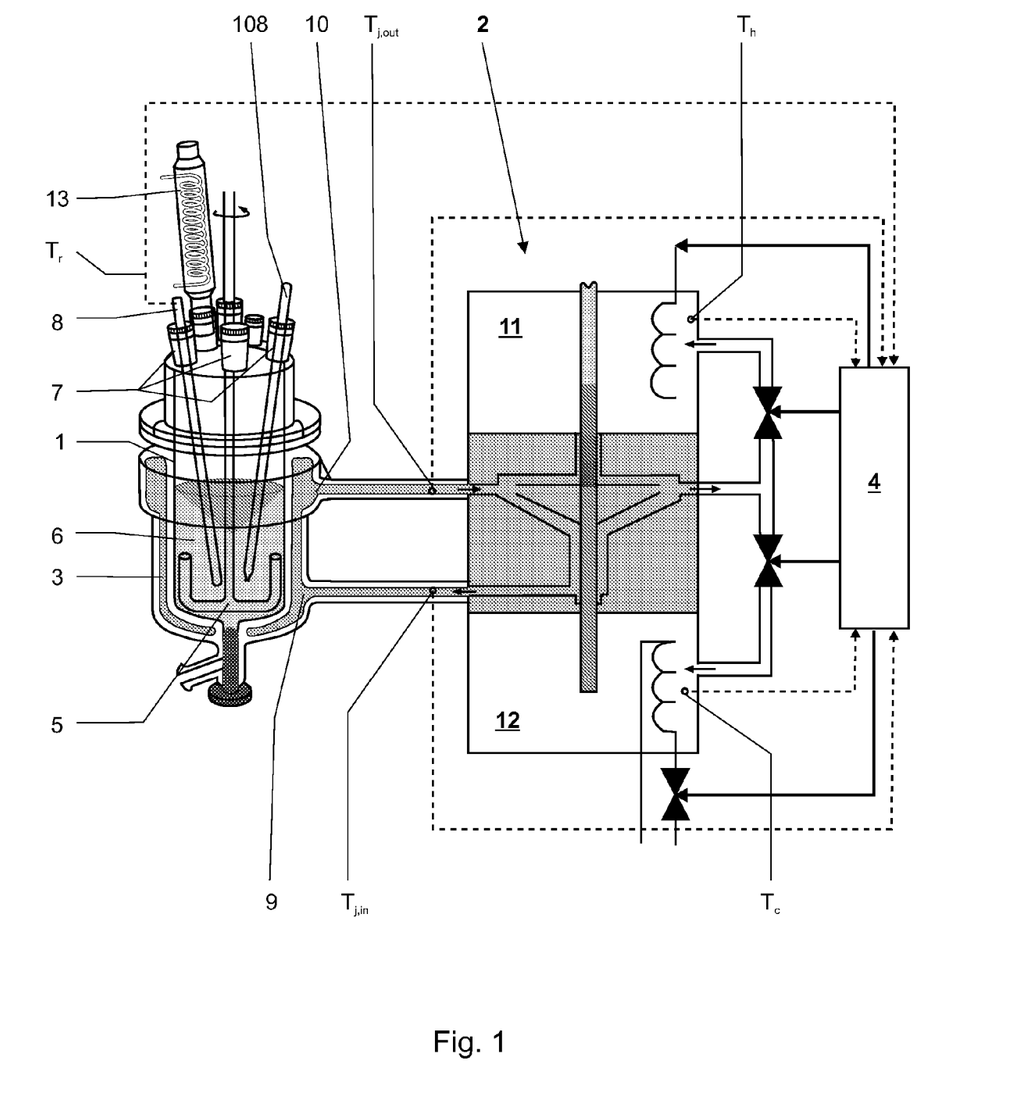
FIG. 1 A schematic representation of a reaction vessel with a temperature-controlling jacket, a heat-transfer unit and a controller.

A general representation of a reactor comprising a reaction vessel 1 with a temperature-controlling device 2, a heat-transfer unit 3 and a controller unit or controller 4 is shown in FIG. 1. The reactor can either be part of a process plant or be part of a laboratory device, preferably a reaction calorimeter. Therefore, the terms industrial and laboratory will be omitted in the description of FIG. 1.

In the reaction vessel 1, a stirrer 5 is arranged for stirring the reaction mixture 6 in the reaction vessel 1. As the reaction vessel 1 is only partly filled with the reaction mixture 6 a vortex formation can be observed. The reaction vessel 1 has several flanges 7 for introducing measuring probes 8, 108 and/or the stirrer 5, for adding further reactants to the reaction mixture 6 in the vessel 1 and/or for attaching a reflux condenser 13.

The reaction vessel 1 is surrounded by a temperature-controlling device in form of a jacket 3, which is filled with a heat-transfer medium. The jacket 3 has an inlet 9 and an outlet 10 connecting the jacket with the heat-transfer unit 2. The heat-transfer unit 2 features a thermostat 11 and a cryostat 12 for providing and maintaining the given temperature setpoints and/or the given temperature profile. The thermostat and/or the cryostat can utilize the same or different heat-transfer media as the jacket 3. By controlling the temperature of the heat-transfer medium also the temperature inside the jacket 3 as well as the temperature in the reaction vessel 1 can be regulated.

A reactor is used to carry out chemical and/or physical reactions or processes. Instructions for carrying out a reaction include at least the kind of reactant or reactants, the sequence of adding these reactants, the speed of adding them as well as at least one reaction temperature and the duration to maintain this temperature. Often also stirring time periods and stirring intensities are given.

Therefore the control unit 4 is designed to control the speed of the stirrer 5, the reaction temperature as a function of the time and if applicable the addition of at least one or more reactants. The temperature can be controlled directly and/or indirectly. The reaction temperature can either be determined by monitoring the temperature $T_r$ directly inside the reaction vessel or by measuring the temperature of the heat-transfer medium $T_{j,in}$ in at the inlet 9 and/or the temperature $T_{j,out}$ out at the outlet 10 of the jacket 3. These temperatures are monitored at given time intervals, so that a monitored temperature profile is created. According to the actual or to the desired reaction temperature, respectively, the control unit 4 adapts the temperature of the heat-transfer medium flowing into the jacket 3 by regulating the temperature in the thermostat $T_h$ and/or the temperature in the cryostat $T_c$ and/or by regulating the flow rate of the heat-transfer medium from the heat-transfer unit 2.

For controlling, monitoring and evaluating the reaction calorimeter and the temperatures profiles, the controller comprises a program with a temperature control algorithm.

In general the control unit 4 will set a temperature profile and/or a first temperature setpoint as well as a time period $\tau$ during which the first temperature is to be maintained. The heat-transfer unit 2 will react accordingly and either heat the reaction mixture 6 up or cool it down until the setpoint or a certain temperature value or point of the profile is reached and maintain that temperature for the given time period. After the first time period a second temperature setpoint is set by the control unit 4 for another time period and so forth, until the end of the reaction is reached. Additionally at least one temperature, preferably the one used as setpoint, is monitored at given time intervals, so that the control unit 4 together with the program comprised therein can compare the set temperature with the actual temperature and can adapt the next temperature setpoint accordingly, if necessary.

The temperature profile and/or setpoints can for example relate to the temperature $T_r$ of the reaction mixture 6 or to the inlet or outlet temperature of the jacket $T_{j,in}$ or $T_{j,out}$. The reactor is therefore controlled by $T_r$ or by $T_j$ as a function of the time.

The Energy Balance of a Reactor

A general approach for the determination of the dynamic temperature behavior of at least one part of a process plant and in particular of a given industrial reactor includes the determination of its heat balance. During the course of a chemical and/or a physical reaction energy is added or removed from the industrial reactor, mostly in form of heat.

The heat balance of the reactor describes the differences between the energy or heat inflow and its outflow. The general expression for the heat balance of a reactor is represented by Eq. 1:

$$\left(\sum_i m_i \cdot Cp_i + \overline{C_w}\right) \cdot \frac{dT_r}{dt} = \tag{1}$$

$$(q_{rx} + q_{dos} + q_{mix} + q_{st}) + (q_{ex} + q_{loss} + q_{reflux})$$

where $m_i$ and $Cp_i$ are the mass and the specific heat capacity of the ith component or reactant in a reaction mixture. $\overline{C_w}$ represents the mean heat capacity of the industrial reaction vessel that follows the temperature of the reaction mixture $T_r$. $\overline{C_w}$ is the result of two contributions: the reaction vessel wall being wetted by the heat-transfer medium and the items inserted into the reaction mixture. The terms for the inflow are given in the first bracket ($q_{rx}+q_{dos}+q_{mix}+q_{st}$). It comprises the power of the reaction $q_{rx}$, which is the heat of the reaction as a function of the time, the input power due to dosing $q_{dos}$, which is the power needed to level the actual temperature to the preset temperature after addition of a reactant, the power due to the mixing enthalpy $q_{mix}$ and the power of the stirrer $q_{st}$, which is the power added to the reaction mixture by the motion of the stirrer. The terms for the outflow are given in the second bracket ($q_{ex}+q_{loss}+q_{reflux}$), it comprises $q_{ex}$ the power exchanged with the heat-transfer medium, $q_{loss}$ the power lost to the surroundings and $q_{reflux}$ the power dissipated in the reflux condenser, in case the reaction is carried out under reflux.

For an experimental approach for the simulation of the dynamic temperature behavior of a given industrial reactor, which is filled with a given amount of a chemically inert fluid, such as for example water or toluene, Eq. 1 can be reduced to Eq. 2, as neither a chemical reaction, a dosing of a at least one reactant nor a physical transformation takes place.

$$(m_r \cdot Cp_r + \overline{C_w}) \cdot \frac{dT_r}{dt} = q_{st} + q_{ex} + q_{loss} \tag{2}$$

$m_r$ and $Cp_r$ represent the mass and the specific heat capacity of the chemically inert fluid inside the industrial reaction vessel.

Many of the parameters of Eq. 2 can at least for certain parts of a given process plant be easily derived from the literature, which comprises any scientific literature, tables and technical documentation and descriptions related to any part of a process plant. Other parameters have to be determined or estimated by using for example heating/cooling experiments which are described later on.

The mass of the reaction mixture $m_r$ can be determined by weighing any reactant before introducing it into the industrial reaction vessel. An even more precise determination is possible by weighing the amount of reactant left after the experiment is completed or terminated, at least when only few reactants are used.

The specific heat capacity $Cp_r$ is temperature dependent and has already been determined for many chemical compounds as well as for some reaction mixtures. These data can either be found in the literature or can be determined beforehand using a classic reaction calorimeter.

$\overline{C_w}$ corresponds to Eq. 3:

$$\overline{C_w} = \sum_i m_{w,i} Cp_{w,i} \tag{3}$$

featuring the mass $m_{w,i}$ and the specific heat capacity $Cp_{w,i}$ of the ith element of the reaction vessel that follows the evolution of $T_r$. The values for $Cp_{w,i}$ are known for most parts and materials comprising an industrial reactor and can be found in the literature or in the respective technical description of the process plant. $m_{w,i}$ can only be estimated as two masses contribute to it. One contribution is the mass of the wall of the reaction vessel being wetted by the heat-transfer medium and the other contribution is a sum of the various masses of elements and items arranged in the reaction mixture, such as for example the stirrer, measuring probes, baffles, etc. The first contribution can be regarded as constant and the second contribution can be determined empirically for example by the proposed heating/cooling experiments or has to be estimated.

The temperature of the reaction mixture $T_r$, the temperatures at the jacket inlet $T_{j,in}$ in and/or at the jacket outlet $T_{j,out}$ as well as their evolution over the time are preferably determined by monitoring their actual temperature profiles during the course of a reaction.

The power of the stirrer $q_{st}$ equals the energy supplied to the reaction mixture by the stirrer. $q_{st}$ is temperature dependent and can be calculated using the well known power equation 4 [e.g. V. Uhl, J. Gray, "Mixing, Theory and Practice", Vol. 1 1966: Academic Press, New York]:

$$q_{st}(T) = Ne \cdot \rho_r(T) \cdot n^3 \cdot d_a^5 \tag{4}$$

where Ne represents the power number, $\rho_r(T)$ the temperature dependent density of the reaction mixture, n the stirring speed and $d_a$ the diameter of the stirrer. The power number Ne has already been determined for various types and sizes of common stirrers and can be found in the literature.

The power exchanged between the heat-transfer medium and the reaction mixture $q_{ex}$ can be calculated according to Eq. 5:

$$q_{ex} = U \cdot A \cdot \Delta T_m \tag{5}$$

U represents the overall heat-transfer coefficient and A the heat exchange area including any respective vortex formation. $\Delta T_m$ stands for the mean temperature difference between the reaction mixture and the heat-transfer medium.

The reciprocate of U, $U^{-1}$, represents the overall resistance of the heat conduction between the reaction mixture and the heat-transfer medium. $U^{-1}$ is represented by Eq. 6:

$$U^{-1} = h_r^{-1} + \frac{d_w}{\lambda_w} + h_j^{-1} = \Phi(T_r) + h_r^{-1} \tag{6}$$

with $h_r$ as the internal heat-transfer coefficient. $h_r$ depends on the properties of the reaction vessel, the stirrer speed and on the thermodynamic properties of the reaction mixture, which are temperature dependent. $\lambda_w$ is the thermal conductivity of the wall of the reaction vessel, $d_w$ the thickness of that wall, $h_j$ the external heat-transfer coefficient and $\Phi(T_r)$ the temperature dependent resistance due to the industrial reactor.

$\Phi(T_r)$ is either already known through previous experiments or through the technical description of the respective process plant or it can be determined experimentally.

$h_r$ is estimated using the well known Nusselt equation 7 [T. Chilton et al., "Heat Transfer Coefficients in Agitated Vessels", Industrial & Engineering Chemistry, 36(6), (1944) 510-516]:

$$h_r = C \cdot \frac{n^{2/3} \cdot d_a^{4/3}}{d_r \cdot g^{1/3}} \cdot \sqrt[3]{\frac{\rho_r^2 \cdot \lambda_r^2 \cdot Cp_r \cdot g}{\mu_r}} \tag{7}$$

where $\rho_r$ represents the density of the reaction mixture, $\lambda_r$ its thermal conductivity and $\mu_r$ its viscosity. $\rho_r$, $\lambda_r$ and $\mu_r$ are estimated with a $4^{th}$ order polynomial fit over the known literature values. C is a constant related to the stirrer, which can also be found in the literature for various types of stirrers. g is the gravitational constant and $d_r$ the diameter of the reaction vessel.

The resistance due to the wall of the reaction vessel $d_w/\lambda_w$ (s. Eq. 6) is estimated using the wall thickness and its thermal conductivity.

The external heat-transfer coefficient $h_j$ has to be estimated empirically following Eq. 8:

$$h_j = a \cdot T_j + b \tag{8}$$

The parameters a and b can be identified by means of least-square fits using an adequate program such as Matlab from The MathWorks. Similar equations for the estimation of parameters a and b are already used by simulation programs such as Visimix from VisiMix Ltd. or BatchReactor from ProSim.

The parameters a and b are assumed to be constant for a given industrial reactor and are therefore independent of the reaction mixture, the mass of the elements introduced in the mixture and of the stirrer revolving speed.

Three terms contribute to the heat exchange area A between the reaction mixture and the heat-transfer medium (s. Eq. 5) namely the bottom area, the side area and the vortex area of the reaction vessel. The vortex area becomes more important, when a given reaction vessel is only partially filled. In that case a high stirrer speed causes a vortex formation in the reaction mixture and the actual heat exchange area resembles that of a fully filled reaction vessel. The vortex formation also depends on the geometry of the reaction vessel and has to be determined experimentally for each given industrial reaction vessel for different fill levels and different stirrer speeds, preferably at least two different fill levels and at least two different stirrer speeds are used.

The last parameter from Eq. 5 is the temperature difference $\Delta T_m$ between the reaction mixture and the heat-transfer medium which can be calculated following Eq. 9 or 10, it depends on the measurable temperatures at the jacket inlet $T_{j,in}$, the jacket outlet $T_{j,out}$ and on the temperature of the reaction mixture $T_r$:

generally $$\Delta T_m = \frac{(T_{j,in} - T_r) - (T_{j,out} - T_r)}{\ln\left(\frac{T_{j,in} - T_r}{T_{j,out} - T_r}\right)} \quad (9)$$

and when $(T_{j,in} + T_r)/(T_{j,out} - T_r) < 0$ $$\Delta T_m = \frac{(T_{j,in} + T_{j,out})}{2} - T_r \quad (10)$$

A term of Eq. 1 or 2 is the power due to losses $q_{loss}$ whose importance increases with an increasing temperature difference between the reaction mixture and the industrial reactor or the reaction vessel, respectively, and the surroundings. $q_{loss}$ also depends on the type of isolation used for the reactor vessel. It is expressed by Eq. 11:

$$q_{loss} = U_{loss} \cdot A_{loss} \cdot (T_{amb} - T_r) \quad (11)$$

with $U_{loss} \cdot A_{loss}$ being the effective heat-transfer coefficient for losses and $T_{amb}$ the ambient air temperature. $U_{loss}$ can be estimated with the approach shown in Eq. 6 by exchanging $h_j$ with $h_{j,air}$, the heat-transfer coefficient due to air. For a specific approach $h_{j,air}$ can be determined according to Eq. 12:

$$h_{j,air} = 8 + 0.04 \cdot (T_w - T_{amb}) \quad (12)$$

with $T_w$ being the wall temperature of the reaction vessel.

According to the equations described above the heat balances of a reactor comprising the external heat-transfer coefficient $h_j$ were determined for five different industrial reactors according to the Eqs. 2 to 12. The parameters a and b of the external heat-transfer coefficient $h_j$ (Eq. 8) as well as the parameters due to a vortex formation were determined experimentally and/or estimated from at least one heating/cooling experiment.

The Dynamic Temperature Evolution of the Temperature Controller

The jacket temperature $T_j$ which constitutes the heat balance of the industrial reactor can be monitored with a suitable measuring probe as a function of the time. Usually the inlet $T_{j,in}$ and/or the outlet $T_{j,out}$ temperature of the jacket are determined during the course of a reaction as a function of the time.

Temperature measurements during heating/cooling experiments showed, that the heat-transfer units of individual process plants behave differently during heating and cooling. Therefore, it is necessary to include not only the jacket temperature but the dynamic temperature evolution of the jacket in the mathematical model describing the dynamic temperature behavior of at least one part of a process plant.

Each process plant, as well as each reaction calorimeter, has its own dynamic temperature evolution or behavior, which depends on several parameters for example the temperature control algorithm used as well as the properties of the temperature-controlling devices, the heat-transfer unit and on the size of the reaction vessel.

Whenever a new temperature setpoint is provided by the control unit, there will be a time delay before the temperature of the reaction mixture reaches the setpoint, even with a very fast reacting heat-transfer unit. This time delay resembles a temperature ramp and depends for example on the control algorithm, the power of the heat-transfer unit, the heat-transfer medium and its flow rate as well as on the physical properties of the reaction vessel and the jacket. For calculating the dynamic temperature evolution of the jacket the algorithm controlling each individual industrial reactor has to be taken into account, as the operation and control of the heat-transfer unit and the jacket temperature, respectively, can vary extremely for different temperature-controlling devices.

Some temperature-controlling devices, here jackets, are for example controlled in such a way, that when a new setpoint temperature is provided a valve between the jacket and the heat-transfer unit is at first opened completely. That valve will only be closed again, partially or fully, when the setpoint has been reached. Therefore, a simple first order approach as proposed in the literature [W. Luyben "Process Modeling, Simulation, and Control for Chemical Engineers", (1990) McGraw-Hill] according to Eq. 13 does not model the jacket temperature sufficiently:

$$y(t) = G \cdot \left[1 - \exp\left(-\frac{t}{\tau}\right)\right] \quad (13)$$

In the literature it was assumed, that the transfer function y(t) between the setpoint temperature $T_{j,set}$ and the jacket temperature $T_j$ follows a first order model, with y(t) as normalized output function, G as control gain and T as time constant.

For a process plant with a temperature-controlling device, which reacts differently during heating and/or cooling, Eq. 13 has to be adapted in order to describe the temperature control algorithm used in each individual process plant. As an example, a P-band controller with different behaviors for heating or cooling can be described by Eq. 14 for heating and similarly for cooling (s. Table 3):

if $$|T_j - T_{j,set}| > c \cdot (T_{j,set} - T_{j,0}) \quad (14)$$

then $$\frac{dT_j}{dt} = \frac{T_{j,max} - T_j}{T_h}$$

else $$\frac{dT_j}{dt} = \frac{T_{j,set} - T_j}{T_h}$$

with c being a parameter, which can be identified by least-square fits using a similar approach as for the determination of a and b (Eq. 8).

Instead of Eq. 14, a complete description of the jacket dynamics would require the solving and calculation of two equations, Eqs. 15 and 16, in order to determine $T_j$ and $T_{j,in}$, respectively:

$$m_j \cdot Cp_j \cdot \frac{dT_j}{dt} = \dot{m}_j \cdot Cp_j \cdot (T_{j,in} - T_{j,out}) - U \cdot A \cdot (T_j - T_r) + q_{loss} \quad (15)$$

with $m_j$ as total mass of the heat-transfer medium, $\dot{m}_j$ its flow rate and $Cp_j$ the specific heat capacity of the heat-transfer medium for the calculation of $T_j$, and $$m_{j,in} \cdot Cp_j \cdot \frac{dT_{j,in}}{dt} = q_{hx} + q_{loss} \quad (16)$$

where $M_{j,in}$ is the mass of the heat-transfer medium inside the heat-transfer unit and $q_{hx}$ the power provided by the heat-transfer unit in order to determine $T_{j,in}$. The heat-transfer unit can utilize for example electricity, vapor, cold water and/or brine for controlling the temperature of the reaction mixture.

It is possible to determine the parameters $M_{j,in}$ and $q_{hx}$ for each given industrial reactor as well as the geometry of the heat-transfer unit and that of the control valves, the vapor pressure, the temperatures of the media used to cool down the heat-transfer medium, e.g. cold water or brine temperatures, and the power supplied by the heat-transfer unit for heating.

For an experimental approach it is sufficient to determine the dynamic temperature evolution of the temperature-controlling device according to Eq. 14.

The Heating/Cooling Experiments

During the already mentioned heating/cooling experiments carried out for each of the five industrial reactors A to E at least the temperature of the reaction mixture $T_r$ inside the reaction vessel is monitored as a function of the time, so that a temperature profile can be determined. Preferably also the jacket outlet temperature $T_{j,out}$ and the jacket inlet temperature $T_{j,in}$ are monitored, again as a function of the time.

These temperature data monitored for each industrial reactor individually in combination with information about the individual temperature control algorithm of each industrial reactor are used to determine the dynamic temperature evolution of the jacket as a function of the time. As the heat-transfer unit of most process plants comprises means for heating as well as means for cooling, individual expressions have to be determined for the heating and cooling phases.

For the heating/cooling experiments the reaction vessel of each of the five industrial reactors was filled with three different reaction masses of toluene or water, respectively. The three masses corresponded to fill levels of the reaction vessel of 1/3, 2/3 or 3/3. For each mass of toluene or water three experiments with different stirrer speeds were carried out. Toluene or water was heated for a preset time period and then cooled down again for another preset time period. For water temperatures between about 20° C. and about 95° C. and for toluene temperatures between about −30° C. and about 105° C. were used depending on the capabilities of the individual process plant.

These heating/cooling experiments were carried out in five different industrial reactors A to E, which have the properties summarized in the following Table 1:

TABLE 1

| | Industrial Reactors | | | | |
|---|---|---|---|---|---|
| Properties | A | B | C | D | E |
| Nominal volume | 630 L | 630 L | 250 L | 49 L | 40 L |
| Material | stainless steel | stainless steel | stainless steel | glass, enamel | stainless steel |
| Diameter of the reaction vessel | 1.00 m | 1.00 m | 0.70 m | 0.40 m | 0.40 m |
| Type of stirrer | Intermig ® | Intermig ® | Intermig ® | impeller | anchor |
| Stirrer diameter | 0.70 m | 0.50 m | 0.35 m | 0.25 m | 0.35 m |
| Baffles | 2 | 2 | 2 | 1 | 1 |
| Wall thickness | 5 mm | 5 mm | 5 mm | 13.2 mm (enamel) | 6 mm |
| Setpoint control | $T_r$ or $T_j$ | $T_r$ or $T_j$ | $T_r$ or $T_j$ | $T_j$ only | $T_j$ only |
| Heat-transfer medium | water/ethylene glycol 50:50 | water/ethylene glycol 50:50 | water/ethylene glycol 50:50 | oil | oil |
| Shape of bottom | Tori-spherical | conical | conical | tori-spherical | tori-spherical |
| Heating | vapor 12 bar | vapor 12 bar | vapor 12 bar | thermostat | thermostat |
| Cooling | cold water brine | cold water brine | cold water brine | cryostat | cryostat |

The five reactors A to E have quite different volumes and also differ in their geometry, the types of material, the heat-transfer medium used and especially in their temperature-controlling devices.

During the heating/cooling experiments different temperatures such as the temperature of the reaction mixture $T_r$ as well as the jacket inlet $T_{j,in}$ and/or the jacket outlet $T_{j,out}$ temperature are monitored as a function of time.

For the heat balance of an industrial reactor the following parameters summarized in Table 2 were determined from the results of the heating/cooling experiments according to the Eqs. 1 to 12:

TABLE 2

| Parameter | Industrial Reactors | | | | |
|---|---|---|---|---|---|
| | A | B | C | D | E |
| a [W · m$^{-2}$ · K$^{-2}$] | 11.4 | 11.0 | 14.9 | 0 | 3.7 |
| b [W · m$^{-2}$ · K$^{-1}$] | −2206.6 | −1981.1 | −3024.4 | 401.7 | −727.7 |
| c [−][° C.] for reactor B | 0.38 | 68.01 | 0.02 | — | — |
| $T_{j,max}$ [K] | 412.4 | 392.9 | 451.8 | 437.6 | 390.1 |
| $T_{j,min}$ [K] | 64.5 | 0.5 | — | 174.5 | 163.2 |
| $\tau_h$ [S] | 332.1 | 329.6 | 308.4 | 2736.8 | 2244.9 |
| $\tau_c$ [S] | 332.1 | 329.6 | 149.3 | 3493.2 | 3223.1 |

The industrial reactors A to E correspond to individual industrial reactors comprised in individual process plants. The parameters a and b are the ones forming the external heat-transfer coefficient $h_j$ (s. Eqs. 8).

For some applications further supplementary terms have to be taken into account for the determination of the heat balance of a reactor such as the power of evaporation $q_{vap}$, especially when the boiling point of the solvent and/or very low jacket temperatures belong to the temperature area of interest.

The dynamic temperature evolutions of the jacket determined according to Eq. 14 are given in the following table 3 for the five industrial reactors A to E:

multiple least-square fits related to the common Rosenbrock integration method, comprising an optimization algorithm, in combination with the Berkley Madonna software from R. Macey and G. Oster, are used.

The Simulation

So far it was shown, that it is possible to describe the dynamic temperature behavior of at least one part of a process plant, in particular its industrial reactor, as a combination of the heat balance of the reactor and the dynamic temperature evolution of its temperature-controlling device, also referred to as jacket.

Based on a complete set of heating/cooling curves, the various parameters such as a, b, c, $T_{j,min}$, $T_{j,max}$, $\tau_h$ and $\tau_c$ are identified for each industrial reactor and a complete mathematical model describing the dynamic temperature behavior is set up for each individual industrial reactor. The complete mathematical model is now used to determine a temperature profile and/or temperature setpoints for controlling the reaction calorimeter.

The controller of the reaction calorimeter comprises a program with the temperature control algorithm and utilizes a temperature profile in the form of a temperature-time-curve and/or in the form of discrete temperature setpoints for controlling the reaction calorimeter and any reaction carried out therein. The program controls any setpoint temperatures as well as all other controllable parameters. It can preferably also be used for recording and evaluating any data obtained during the course of a chemical and/or a physical reaction, which are mainly temperature data. An example for such a program is the WinRC software by Mettler Toledo developed to control a reaction calorimeter, in particular the RC1 by Mettler Toledo, and evaluate any recorded data.

When the preset temperature profile and/or the setpoints are derived from a mathematical model describing the

TABLE 3

| Reactor | Heating phase | Cooling phase |
|---|---|---|
| A | if $|T_j - T_{j,set}| > c \cdot (T_{j,set} - T_{j,0})$ then $\dfrac{dT_j}{dt} = \dfrac{T_{j,max} - T_j}{\tau_h}$ <br> else $\dfrac{dT_j}{dt} = \dfrac{T_{j,set} - T_j}{\tau_h}$ | if $|T_j - T_{j,set}| > c \cdot (T_{j,0} - T_{j,set})$ then $\dfrac{dT_j}{dt} = \dfrac{T_{j,min} - T_j}{\tau_c}$ <br> else $\dfrac{dT_j}{dt} = \dfrac{T_{j,set} - T_j}{\tau_c}$ |
| B | if $|T_j - T_{j,set}| > c$ then $\dfrac{dT_j}{dt} = \dfrac{T_{j,max} - T_j}{\tau_h}$ <br> else $\dfrac{dT_j}{dt} = \dfrac{T_{j,set} - T_j}{\tau_h}$ | if $|T_j - T_{j,set}| > c$ then $\dfrac{dT_j}{dt} = \dfrac{T_{j,min} - T_j}{\tau_c}$ <br> else $\dfrac{dT_j}{dt} = \dfrac{T_{j,set} - T_j}{\tau_c}$ |
| C | if $|T_j - T_{j,set}| > c \cdot (T_{j,set} - T_{j,0})$ then $\dfrac{dT_j}{dt} = \dfrac{T_{j,max} - T_j}{\tau_h}$ <br> else $\dfrac{dT_j}{dt} = \dfrac{T_{j,set} - T_j}{\tau_h}$ | $\dfrac{dT_j}{dt} = \dfrac{T_{j,set} - T_j}{\tau_c}$ |
| D & E | if $T_j < T_{j,set}$ $\dfrac{dT_j}{dt} = \dfrac{T_{j,max} - T_j}{\tau_h}$ <br> else $\dfrac{dT_j}{dt} = 0$ | if $T_j > T_{j,set}$ $\dfrac{dT_j}{dt} = \dfrac{T_{j,min} - T_j}{\tau_c}$ <br> else $\dfrac{dT_j}{dt} = 0$ |

The maximum $T_{j,max}$ and minimum $T_{j,min}$ jacket temperatures as well as the time constants for the heating phase $\tau_h$ and that for the cooling $\tau_c$ and the parameter c are preferably identified using multiple least-square fits. In particular the dynamic temperature behavior of at least one part of a process plant, the reaction calorimeter follows that dynamic temperature and any reaction is carried out under temperature conditions resembling those of a process plant.

The mathematical model is either a part of the program or is at least able to exchange data with the program, in particular with temperature control algorithm.

Figure 2:
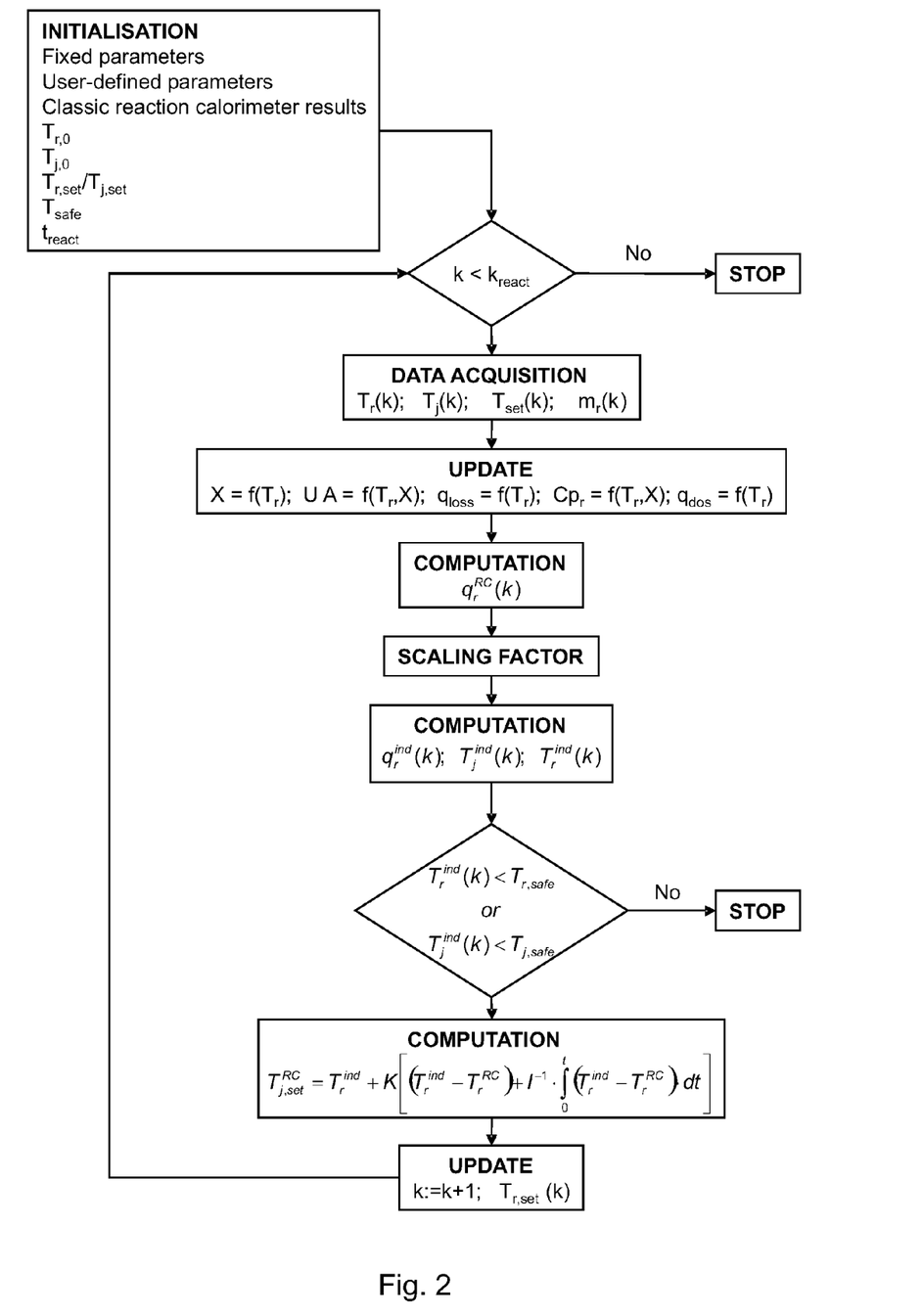
FIG. 2 a flow chart representing the simulation method.

The simulation of at least one part of a process plant at laboratory scale follows the diagram shown in FIG. 2.

First of all the reaction calorimeter has to be initialized and the already known parameters have to be feed into the program. These parameters include fixed and user-defined parameters for example parameters related to the proportions and properties of at least one part of a process plant to be simulated, in particular of the industrial reactor and its various parts ($d_R$, $d_a$, $d_w$, $\lambda_w$, $\overline{C_w}$, C, Ne), parameters related for example to the reaction to be carried out ($m_r$, n), initial temperatures ($T_{r,0}$, $T_{j,0}$), a temperature profile and/or temperature setpoints ($T_{r,set}$, $T_{j,set}$) as well as a minimum and/or maximum absolute temperature ($T_{safe}$).

Further parameters related to the reaction carried out with a classic reaction calorimeter are also fed into the program. These parameters, mainly thermodynamic parameters and properties, are obtained by carrying out the reaction under investigation in a classic reaction calorimeter before starting any simulation. Preferably, the reaction is carried out at least twice with different reaction temperatures.

After the initialization the reaction is started in the reaction calorimeter, while the reaction calorimeter is controlled by a temperature profile derived from the mathematical model.

After a first time interval $\Delta t$ corresponding to a timer event k at least one temperature is measured. Preferably the temperature of the reaction mixture $T_r(k)$, the jacket temperature $T_j(k)$ and the preset temperature $T_{set}(k)$, which can be $T_{j,set}(k)$ or $T_{r,set}(k)$, are determined, each with a different measuring probe arranged in the reaction calorimeter. The mass of the reaction mixture, $m_r(k)$ is also measured by means of a weighing device. The time intervals $\Delta t$ can be set by the user, they are preferably in a range between 1 s and several minutes.

The temperatures and the mass determined after the first time interval are used to calculate and update some of the parameters mentioned in Eqs. 1 to 16, namely the thermal conversion X as a function of $T_r$, the effective heat transfer coefficient U·A as a function of $T_r$ and X, the power due to losses $q_{loss}$ as a function of $T_r$, the specific heat capacity of the reaction mixture $Cp_r$ as a function of $T_r$ and X and the power due to dosing $q_{dos}$ as a function of $T_r$.

These updated parameter values and temperature values are used to compute a first heat balance for the reaction calorimeter (RC) itself in order to calculate the heat of reaction $q_r^{RC}$ at a specific timer event k following Eq. 17:

$$q_r^{RC} = m_r^{RC} \cdot Cp_r^{RC} \cdot \frac{\Delta T_r^{RC}}{\Delta t} + U \cdot A \cdot (T_r^{RC} - T_j^{RC}) + q_{dos}^{RC} - q_{loss}^{RC} \quad (17)$$

The heat of reaction at a certain timer event $q_r^{RC}(k)$ obtained according to Eq. 17 is multiplied with a scaling factor in order to obtain $q_r^{ind}(k)$. The scaling factor preferably relates to the ratio of the reaction mass in the reaction calorimeter to the hypothetical reaction mass in the industrial reactor.

Then a second heat balance is computed for the simulated industrial reactor (ind) and the hypothetical change of the temperature of the reaction mixture in the industrial reactor during the time interval $\Delta t$ is calculated according to Eq. 18:

$$\Delta T_r^{ind} = \frac{q_r^{ind} + q_{ex}^{ind} + q_{st}^{ind} + q_{loss}^{ind}}{(m_r^{ind} \cdot Cp_r^{ind}) + \overline{C_w^{ind}}} \cdot \Delta t \quad (18)$$

the various terms of Eq. 18 deriving from the Eqs. 1 to 17 described above.

Besides, $q_r^{ind}(k)$, $T_r^{ind}(k)$ and $T_j^{ind}(k)$ are determined. These temperatures are compared with the safety margins set for the reaction calorimeter $T_{j,safe}^{RC}(k)$ and $T_{r,safe}^{RC}(k)$. When the computed temperature values lie above the safety margins the reaction is terminated.

When the temperatures are still inside the preset safety margins, a new setpoint value for the jacket temperature $T_{j,set}^{RC}$ of the reaction calorimeter (RC) is computed from the temperature of the reaction mixture of the industrial reactor $T_r^{ind}$. $T_{j,set}^{RC}$ can be calculated using a conventional PI controller function according to Eq. 19. This procedure allows the anticipation of the control dynamics of the reaction calorimeter:

$$T_{j,set}^{RC} = T_r^{ind} + K \cdot \left( (T_r^{ind} - T_r^{RC}) + I^{-1} \cdot \int_0^t (T_r^{ind} - T_r^{RC}) \cdot dt \right) \quad (19)$$

with K and I being the proportional and integral parameters respectively.

The heat balance equation used permits a very good description of the temperature evolution within the industrial reactor. Moreover, the treatment of the dynamic temperature evolution of the jacket as two dynamic first order systems allows the description of the temperature evolution following a setpoint change.

The new temperature setpoint $T_{j,set}^{RC}$ is set and the timer is counted up k:=k+1.

This routine of measuring temperatures, computing $q_r^{RC}$, scaling it and determining a new temperature setpoint T $T_{j,set}^{RC}$ is followed or reiterated until the reaction has reached its end defined by $k_{react}$ or has to be terminated, because the preset safety margins have been reached.

Preferably the jacket temperature $T_j^{RC}$ is used as setpoint temperature $T_{j,set}^{RC}$, as it was discovered, that when a new setpoint is sent to the reaction calorimeter, the reaction temperature does not adapt itself immediately, as $T_r^{RC}$ follows its setpoint $T_{r,set}^{RC}$ with a delay that is proportional to an instantaneous temperature ramp.

Therefore, normally the jacket temperature $T_j^{RC}$ is controlled rather than the temperature of the reaction mixture $T_r^{RC}$, as the dynamics of $T_j^{RC}$ are much faster than those of $T_r^{RC}$, especially when a reaction calorimeter such as the RC1 by Mettler Toledo is used, which has a powerful heat-transfer unit.

The invaluable advantage of this simulating method is that the kinetics of the reaction are not a prerequisite to predict the thermal behavior of the process plant, but only the temperature dynamics of the process plant, in particular of the industrial reactor.

Such a simulation method is extremely useful, particularly for the scale-up of exothermic or temperature dependent reactions and processes, as it is possible to predict the behavior of the reaction at industrial scale as well as predicting production rates and yields while the reaction is otherwise still at laboratory scale. Neither the reaction mechanism nor the reaction kinetics have to be explicitly known by the skilled person: the focus lies solely on the thermal data and the temperature control.

With the simulation method presented, it is possible to carry out a reaction and predict its behavior at industrial scale with a laboratory device. The prediction is more precise when the composition of the used reaction mixture closely resembles that to be used under industrial conditions.

What is claimed is:

1. A method for simulating the dynamic temperature behavior of at least one part of a process plant, the process plant part comprising an industrial-scale reactor with an industrial-scale reaction vessel for carrying out a chemical and/or a physical reaction, an industrial-scale temperature-control device interacting with the industrial-scale reaction vessel, an industrial-scale heat-transfer unit interacting with the industrial-scale temperature-control device, and an industrial-scale process control unit for at least controlling the industrial-scale temperature-control device, the method comprising the steps of:
   providing a laboratory-scale device, comprising a laboratory-scale reaction vessel, a laboratory-scale temperature-control device interacting with the laboratory-scale reaction vessel, a laboratory-scale heat-transfer unit interacting with the laboratory-scale temperature-control device, and a laboratory-scale process control unit for operating and controlling the laboratory-scale device;
   deriving temperature control data, corresponding to predetermined time intervals, from a mathematical model that describes the dynamic temperature behavior of the process plant part and that is derived at least partially from a heat balance of the process plant part, the temperature control data comprising at least one of a temperature profile and a set of temperature setpoints; and
   controlling the laboratory-scale device using the derived temperature control data in association with the laboratory-scale process control unit.

2. The method of claim 1, wherein:
the controlling step comprises controlling at least one temperature related to either the laboratory-scale reaction vessel or the laboratory-scale temperature-control device.

3. The method of claim 2, wherein:
the mathematical model is at least partially derived from a characteristic property of the industrial-scale reactor or a physical or chemical parameter derived therefrom, the characteristic property selected from at least one of the configuration, the geometry and the material of the process plant part.

4. The method of claim 1, wherein:
at least one of the parameters forming the heat balance is estimated experimentally by at least one experiment carried out in the industrial-scale reaction vessel with the reactants under either heating or cooling, and with the industrial reactor filled to at least two different fill levels.

5. The method of claim 1, wherein:
at least one of the parameters forming the heat balance is related to at least one characteristic property of the temperature control device, in particular its dynamic temperature evolution.

6. The method of claim 5, wherein:
the dynamic temperature evolution of the temperature control device is determined experimentally and individually for the process plant part.

7. The method of claim 1, wherein:
the mathematical model is at least partially derived from a characteristic property of the industrial-scale reactor or a physical or chemical parameter derived therefrom, the characteristic property selected from at least one of the configuration, the geometry and the material of the process plant part.

8. A method for simulating the dynamic temperature behavior of at least one part of a process plant using a laboratory device, the process plant part comprising an industrial-scale reactor with an industrial-scale reaction vessel for carrying out a chemical and/or a physical reaction, an industrial-scale temperature-control device interacting with the industrial-scale reaction vessel, an industrial-scale heat-transfer unit interacting with the industrial-scale temperature-control device, and an industrial-scale process control unit for at least controlling the industrial-scale temperature-control device, and the laboratory device comprising a laboratory-scale reaction vessel for carrying out a chemical and/or a physical reaction, a laboratory-scale temperature-control device interacting with the laboratory-scale reaction vessel, a laboratory-scale heat-transfer unit interacting with the laboratory-scale temperature-control device, and a laboratory-scale process control unit for operating and controlling the laboratory device, wherein the laboratory-scale process control unit comprises a program with a temperature control algorithm; the method comprising the steps of:
   a. determining a mathematical model that describes the dynamic temperature behavior of the process plant part, the model derived at least partially from a heat balance of the process plant part;
   b. deriving temperature control data from the mathematical model, the temperature control data comprising at least one of a temperature profile and a set of temperature setpoints corresponding to given time intervals;
   c. carrying out the reaction in the laboratory device;
   d. using the temperature control data to control the laboratory device;
   e. measuring at least one temperature in the laboratory device at given time intervals, the measured temperature being related to at least one part of the laboratory device and/or to the reaction;
   f. calculating at least one thermodynamic property corresponding to given time intervals using the at least one measured temperature; and
   g. repeating steps d through f, until the value of a predefined property or parameter related to the reaction signals the end of the reaction.

9. The method of claim 8, wherein:
the predefined property or parameter is derived from at least one of the group consisting of: a preset maximum or minimum temperature related to the laboratory-scale device and/or to the reaction, the consumption rate of at least one of the reactants of the reaction, the production rate, the yield, the heat release rate, a preset reaction time and any combination thereof.

10. The method of claim 9, wherein:
the value of the thermodynamic property obtained while simulating the dynamic temperature behavior of the process plant part is scaled by applying a scaling factor corresponding to differences between the process plant part and the laboratory device, in particular the volume of the respective reaction vessels and/or of the respective reaction masses.

11. The method of claim 10, wherein:
the temperature control data are adaptable during the course of the reaction.

12. A laboratory device for simulating the dynamic temperature behavior of at least one part of a process plant, the process plant part comprising an industrial-scale reactor with an industrial-scale reaction vessel for carrying out a chemical and/or a physical reaction, an industrial-scale temperature-control device interacting with the industrial-scale reaction vessel, an industrial-scale heat-transfer unit interacting with the industrial-scale temperature-control device, and an industrial-scale process control unit for at least controlling the industrial-scale temperature-control device, the laboratory device comprising:
- a laboratory-scale reaction vessel;
- a laboratory-scale temperature-control device interacting with the laboratory-scale reaction vessel;
- a laboratory-scale heat-transfer unit interacting with the laboratory-scale temperature-control device;
- at least one temperature probe; and
- a laboratory-scale process control unit, comprising a program with a temperature control algorithm derived from a mathematical model that describes the dynamic temperature behavior of the process plant part and that is derived at least partially from a heat balance of the process plant part.

13. The device of claim 12, wherein:
the laboratory-scale temperature-control device acts directly.

14. The device of claim 13, wherein:
the at least one temperature probe is arranged in at least one of the reaction vessel and the temperature-control device.

15. The device of claim 14, wherein:
the program uses temperature control data comprising at least one of a temperature profile and a set of temperature setpoints derived from the mathematical model.

16. The device of claim 15, further comprising:
the algorithm is designed to control, monitor and to evaluate at least any preset and/or monitored temperature profile and/or temperature setpoints.

17. The device of claim 12, wherein:
the at least one temperature probe is arranged in at least one of the reaction vessel and the temperature-control device.

18. The device of claim 12, wherein:
the program uses temperature control data comprising at least one of a temperature profile and a set of temperature setpoints derived from the mathematical model.

19. The device of claim 12, further comprising:
the algorithm is designed to control, monitor and to evaluate at least any preset and/or monitored temperature profile and/or temperature setpoints.

* * * * *

UNITED STATES PATENT AND TRADEMARK OFFICE
CERTIFICATE OF CORRECTION

PATENT NO. : 7,476,020 B2
APPLICATION NO. : 11/530928
DATED : January 13, 2009
INVENTOR(S) : Zufferey et al.

It is certified that error appears in the above-identified patent and that said Letters Patent is hereby corrected as shown below:

On the title page, item (75), please delete "Benoit Zufferey" and insert -- Benoît Zufferey --.

In column 13, lines 38-42, please delete "and when $$(T_{j,in}+T_r)/(T_{j,out}-T_r) < 0$$
$$\Delta T_m = \frac{(T_{j,in} + T_{j,out})}{2} - T_r \qquad (10)"$$

and insert -- and when $(T_{j,in}-T_r)/(T_{j,out}-T_r) < 0$
$$\Delta T_m = \frac{(T_{j,in} + T_{j,out})}{2} - T_r \qquad (10) --.$$

Signed and Sealed this

Twenty-fourth Day of February, 2009

JOHN DOLL
*Acting Director of the United States Patent and Trademark Office*